United States Patent
Aoki et al.

(10) Patent No.: US 6,356,990 B1
(45) Date of Patent: Mar. 12, 2002

(54) SET-ASSOCIATIVE CACHE MEMORY HAVING A BUILT-IN SET PREDICTION ARRAY

(75) Inventors: Naoaki Aoki; Sang Hoo Dhong; Nobuo Kojima, all of Austin, TX (US); Joel Abraham Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/496,474

(22) Filed: Feb. 2, 2000

(51) Int. Cl.⁷ .............................................. G06F 12/08
(52) U.S. Cl. ...................................... 711/205; 711/128
(58) Field of Search ............................ 711/3, 128, 204, 711/205, 213, 167, 168, 137

(56) References Cited

U.S. PATENT DOCUMENTS

| | | | | |
|---|---|---|---|---|
| 5,235,697 A | * | 8/1993 | Steely, Jr. et al. | 711/137 |
| 5,418,922 A | * | 5/1995 | Liu | 711/3 |
| 5,845,323 A | * | 12/1998 | Roberts et al. | 711/128 |
| 5,956,746 A | * | 9/1999 | Wang | 711/137 |
| 6,016,533 A | * | 1/2000 | Tran | 711/128 |
| 6,222,214 B1 | * | 4/2001 | Wuu et al. | 257/296 |
| 6,247,094 B1 | * | 6/2001 | Kumar et al. | 711/3 |

* cited by examiner

Primary Examiner—Do Hyun Yoo
Assistant Examiner—Gary J. Portka
(74) Attorney, Agent, or Firm—Casimer K. Salys; Bracewell & Patterson, L.L.P.

(57) ABSTRACT

A set-associative cache memory having a built-in set prediction array is disclosed. The cache memory can be accessed via an effective address having a tag field, a line index field, and a byte field. The cache memory includes a directory, a memory array, a translation lookaside buffer, and a set prediction array. The memory array is associated with the directory such that each tag entry within the directory corresponds to a cache line within the memory array. In response to a cache access by an effective address, the translation lookaside buffer determines whether or not the data associated with the effective address is stored within the memory array. The set prediction array is built-in within the memory array such that an access to a line entry within the set prediction array can be performed in a same access cycle as an access to a cache line within the memory array.

10 Claims, 4 Drawing Sheets

SET-ASSOCIATIVE CACHE MEMORY HAVING A BUILT-IN SET PREDICTION ARRAY

BACKGROUND OF THE INVENTION

1. Technical Field

The present invention relates to cache memories in general, and in particular to set-associative cache memories. Still more particularly, the present invention relates to a set-associative cache memory having a built-in set prediction array.

2. Description of the Prior Art

In order to increase the speed of access to data stored within a system memory, modern data processing systems generally maintain the most recently used data in a high-speed memory known as a cache memory. This cache memory has multiple cache lines, with several bytes per cache line for storing information in contiguous addresses within the system memory. In addition, each cache line has an associated tag that typically identifies a partial address of a corresponding page of the system memory. Because the information within each cache line may come from different pages of the system memory, the tag provides a convenient way to identify to which page of the system memory a cache line belongs.

In order to improve cache hit ratio, set-associative cache memories are commonly utilized in most data processing systems. Generally speaking, for a set-associative cache memory, a higher number of sets typically yields a higher hit ratio. However, most set-associative cache memories employ a so-called "late select" scheme that requires all sets within a set-associative cache memory to be activated simultaneously, and a set-select multiplexor to select one of the sets in which the "hit" cache line resided. Thus, more power will be consumed as the number of sets increases.

One solution to the above-mentioned problem is to use a set prediction scheme. By allowing only one wordline to be activated based on a prediction method to select only one of the many sets, the set prediction scheme saves power and also improves access time. A bit called the most-recently used (MRU) bit is usually used to predict one of the sets. The MRU bit typically requires to access a translation lookaside buffer (TLB) before the MRU bit can be sent from the TLB to the memory array of the cache memory. The access path to the TLB is known to be one of critical paths for cache accesses such that additional cycles are commonly required. However, because of its relatively large size, the TLB usually cannot be placed at close proximity to the memory array. As a result, the total cache access time of a set-associative cache memory increases with the sizes of its TLB and memory arrays. Consequently, it would be desirable to provide an improved set-associative cache memory with fast access time and yet low power consumption.

SUMMARY OF THE INVENTION

In accordance with a preferred embodiment of the present invention, a cache memory can be accessed via an effective address having a tag field, a line index field, and a byte field. The cache memory includes a directory, a memory array, a translation lookaside buffer, and a set prediction array. The memory array is associated with the directory such that each tag entry within the directory corresponds to a cache line within the memory array. In response to a cache access by an effective address, the translation lookaside buffer determines whether or not the data associated with the effective address is stored within the memory array. The set prediction array is built-in within the memory array such that an access to a line entry within the set prediction array can be performed in a same access cycle as an access to a cache line within the memory array.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of processors having a cache memory. The cache memory may be, for example, a primary cache, a secondary cache, or a tertiary cache.

Figure 1:
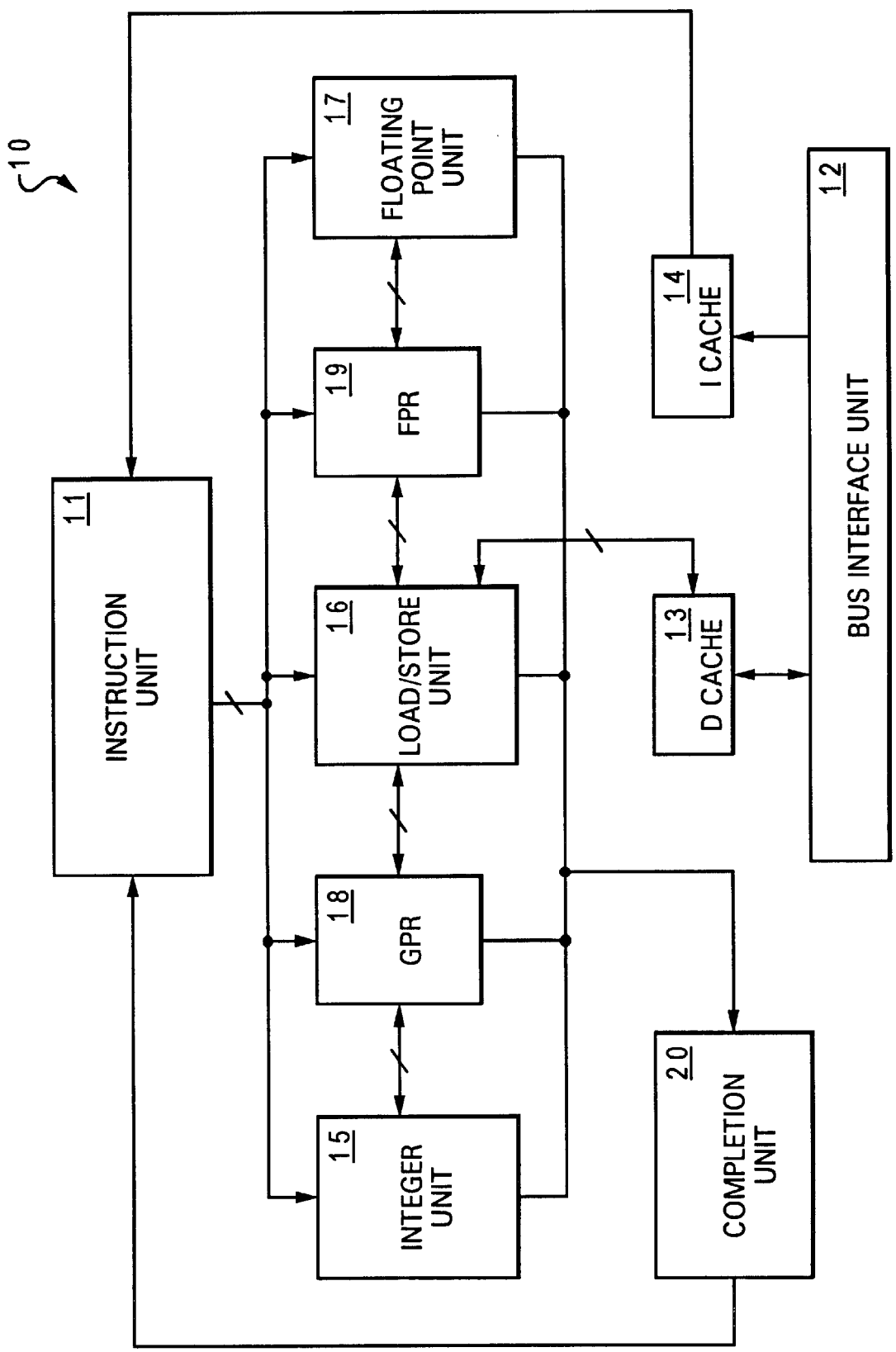
FIG. 1 is a block diagram of a processor in which a preferred embodiment of the present invention may be incorporated.

Referring now to the drawings and in particular to FIG. 1, there is depicted a block diagram of a processor in which a preferred embodiment of the present invention may be incorporated. Within a processor 10, a bus interface unit 12 is coupled to a data cache 13 and an instruction cache 14. Both data cache 13 and instruction cache 14 are high speed set-associative caches which enable processor 10 to achieve a relatively fast access time to a subset of data or instructions previously transferred from a main memory (not shown). Instruction cache 14 is further coupled to an instruction unit 11 which fetches instructions from instruction cache 14 during each execution cycle.

Processor 10 also includes three execution units, namely, an integer unit 15, a load/store unit 16, and a floating-point unit 17. Each of execution units 15–17 can execute one or more classes of instructions, and all execution units 15–17 can operate concurrently during each processor cycle. After execution has terminated, execution units 15–17 store data results to a respective rename buffer, depending upon the instruction type. Then, any one of execution units 15–17 signals a completion unit 20 that the instruction unit has been finished. Finally, instructions are completed in program order by transferring result data from the respective rename buffer to a general purpose register 18 or a floating-point register 19.

Figure 2:
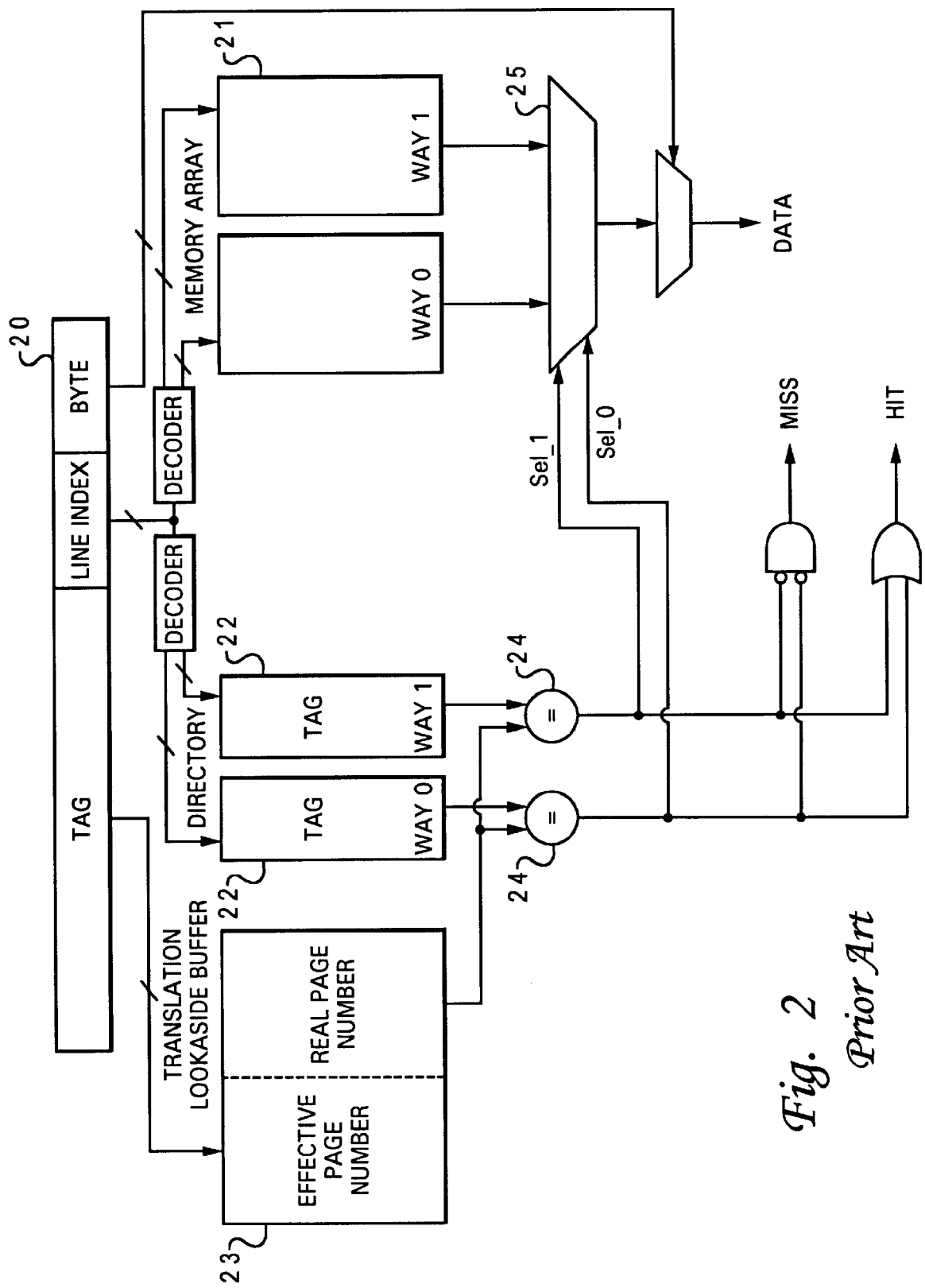
FIG. 2 is a block diagram of a set-associative cache memory according to the prior art.

With reference now to FIG. 2, there is illustrated a block diagram of a set-associative cache memory according to the prior art. The set-associative cache memory may be a data cache or an instruction cache. As shown, the 5 set-associative cache memory includes a memory array 21 along with a directory 22, both of which are divided into two ways, namely, way 0 and way 1. Each cache line in memory array 21 has a corresponding row in directory 22. The data or instructions portion of a cache line is maintained in memory array 21 while the tag portion of the same cache line is maintained in directory 22.

The information stored in memory array 21 may be accessed by an effective address 20. Effective address 20 includes a tag field, a line index field, and a byte field. The tag field of effective address 20 is utilized to provide cache "hit" information as will be described infra. The line index field of effective address 20 is utilized to select a specific cache line within memory array 21, and the byte field of effective address 20 is utilized to index a specific byte within the selected cache line.

Also shown in FIG. 2 is a translation lookaside buffer (TLB) 23 for translating an effective address to a corresponding real address. Specifically, TLB 23 translates the page number portion of an effective address to a corresponding real page number. For example, the tag field of effective address 20 (which is part of the page number of effective address 20) is sent to TLB 23 to be translated to a corresponding real page number. This real page number is utilized for comparison with a tag of the selected cache line from directory 22 in order to determine whether there is a cache "hit" or "miss." Incidentally, a match between a tag from one of two ways in directory 22 and the real page number implies a cache "hit." The cache "hit" signal (i.e., Sel_0 or Sel_1) is also sent to a set-select multiplexor 25 to select an output from one of the two ways of memory array 21.

Figure 3:
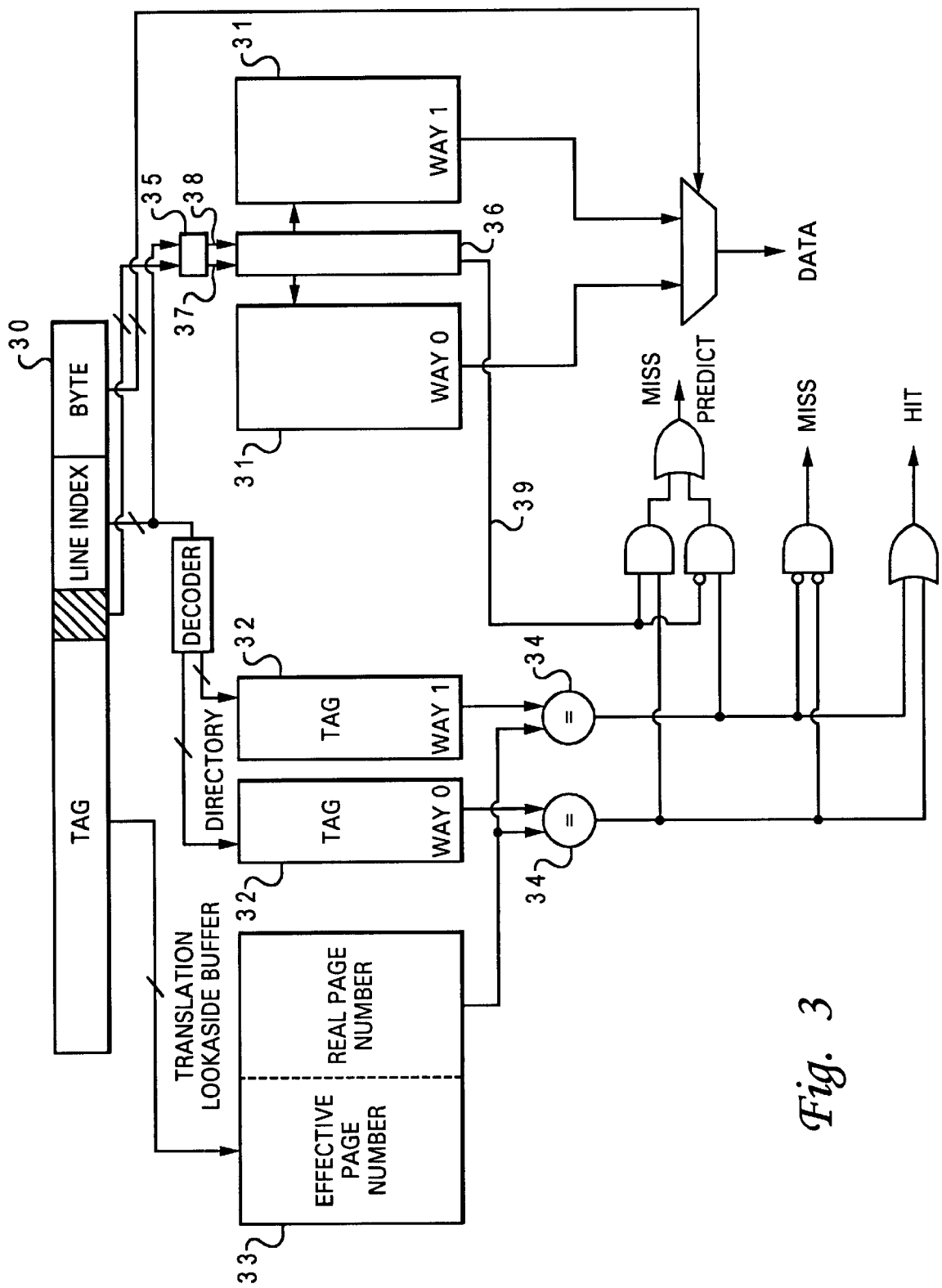
FIG. 3 is a block diagram of a set-associative cache memory having a built-in set prediction array, in accordance with a preferred embodiment of the present invention.

Referring now to FIG. 3, there is illustrated a block diagram of a set-associative cache memory having a built-in set prediction array, in accordance with a preferred embodiment of the present invention. Similar to the set-associative cache memory from FIG. 2, set-associative cache memory in FIG. 3 includes a memory array 31 and a directory 32, both of which are divided into two ways-way 0 and way 1, both of which have multiple cache lines. The data or instructions portion of a cache line is maintained in memory array 31, while the tag portion of the same cache line is maintained in directory 32. The set-associative cache memory may be a data cache, an instruction cache, or an unified cache storing both data and instructions.

The information stored in memory array 31 may be accessed by an effective address 30. Effective address 30 includes a tag field for providing cache "hit" information, a line index field for selecting a specific cache line, and a byte field for indexing a specific byte within the selected cache line. For a four-Kbyte page having 32 cache lines, the line index field can be, for example, five bits wide and the byte field can be, for example, seven bits wide.

In accordance with a preferred embodiment of the present invention, a set prediction array 36 is incorporated (or built-in) within memory array 31. There are two inputs to set prediction array 36, namely, a line index input 38 and a set prediction input 37. Line index input 38 can be obtained by decoding the bits in line index field of effective address 30 via a decoder 35. Set prediction input 37 can be obtained by decoding the last several bits, known as set prediction bits (indicated by the shaded area), of the tag field of effective address 30 via decoder 35.

There are many line entries within set prediction array 36. Each line entry within set prediction array 36 has a corresponding cache line in way 0 as well as way 1 of memory array 31. In addition, each line entry within set prediction array 36 includes multiple set prediction slots. The selection of a line entry within set prediction array 36 is determined by line index input 38, and the selection of a set prediction slot within a selected line entry is determined by set prediction input 37. The number of set prediction bits defines the number of set prediction slots in each line entry, which also defines the set prediction resolution for set prediction array 36. For example, if two set prediction bits are utilized, then the number of set prediction slots (or the set prediction resolution) is four, and if three set prediction bits are utilized, then the number of set prediction slots (or the set prediction resolution) is eight. Furthermore, each set prediction slot has, in this two-way cache memory implementation, one bit to indicate a predicted set. For example, a "0" bit in a set prediction slot indicates way 0 and a "1" bit indicates way 1. Additional bits will be required for a higher set associativity.

In addition, a set prediction line 39 that indicates the bit stored in the selected set prediction slot is utilized to generate a miss predict signal. The miss predict signal along with the "hit" or "miss" signal are then sent to some control circuitry (not shown), as it is known by those skilled in the relevant art.

With set prediction array 36 being incorporated within memory array 31, any access to set prediction array 36 can be performed at the same cycle (concurrently) as sending an address, such as a line index, to memory array 31. In other words, set prediction array 36 does not have to be accessed before sending the line index to memory array 31. Thus, when compared to the prior art cache memory shown in FIG. 2, the cache memory shown in FIG. 3 has less total cache access latency.

Figure 4:
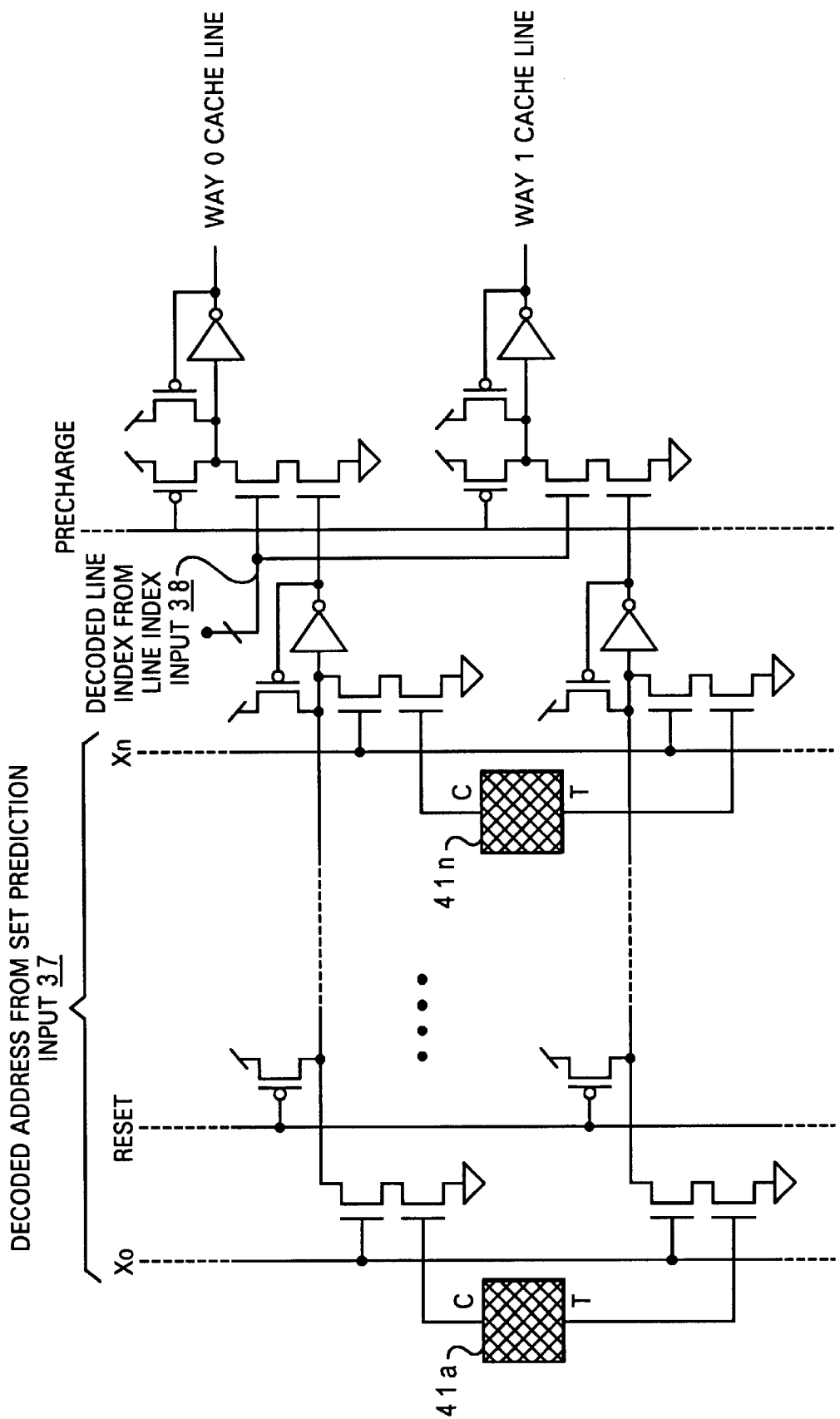
FIG. 4 is a circuit diagram of the set prediction array from FIG. 3, in accordance with a preferred embodiment of the present invention.

With reference now to FIG. 4, there is illustrated a circuit diagram of set prediction array 36, in accordance with a preferred embodiment of the invention. As shown, a line entry within set prediction array 36 is selected according to a decoded line index from line index input 38 (from FIG. 3). This line entry corresponds to a cache line from way 0 and a cache line from way 1, both having the same line index as the line entry. At the same time, X0–Xn signals are decoded signals from set prediction input 37 (from FIG. 3) to select a set prediction slot of the selected line entry. Specifically, only one of the X0–Xn signals is activated to select a corresponding set prediction slot, and the bit stored within the selected set prediction slot determines whether the corresponding selected cache line from way 0 or the corresponding selected cache line from way 1 should be activated. Each of the set prediction slots, such as set prediction slots 41a–41n, can be implemented by a standard six-transistor storage cell having a true (T) output and a complement (C) output, as it is well-known in the art. The bits within set prediction slots 41a–41n can be assigned in accordance with the most-recently used (MRU) set of the previous cycle.

Using the two cache lines shown in FIG. 4 as an example, if X0 signal line is activated, then only one of the two cache lines will be activated, depending on the bit stored within set prediction slot 41a.

As has been described, the present invention provides a set-associative cache memory having a built-in set prediction array. Since the built-in set prediction array is used, the set-associative cache memory of the present to invention acts like a direct-mapped cache memory that is known to be relatively faster than a typical set-associative cache memory. In addition, the set-associative cache memory of the present invention provides a faster cache access with lower power and low "miss" rate. Although a two-way set-associative cache memory is utilized to illustrate the present invention, it is understood by those skilled in the relevant art that the principle of the present invention can also be applicable to cache memories with higher set-associativities.

While the invention has been particularly shown and described with reference to a preferred embodiment, it will be understood by those skilled in the art that various changes in form and detail may be made therein without departing from the spirit and scope of the invention.

What is claimed is:

1. A cache memory that can be accessed via an effective address having a tag field, a line index field, and a byte field, said cache memory comprising:

a directory;

a memory array associated with said directory, wherein said memory array includes a plurality of congruence classes and each of said congruence classes includes a plurality of sets, wherein said memory array includes a set prediction array integrated within said memory array via an association of a line entry within said set prediction array to a congruence class within said memory array such that said line entry within said set prediction array and said congruence class are accessed in a same cycle, wherein said line entry within said set prediction array includes a plurality of set prediction resolution slots, the number of said plurality of set prediction resolution slots does not correspond to the number of sets within each of said congruence classes, and one of said plurality of prediction resolution slots is selected during said cache access by a subset of bits from said tag field; and a translation lookaside buffer for determining whether or not said cache memory stores data associated with an effective address, in response to said cache access by said effective address.

2. The cache memory according to claim 1, wherein the number of said prediction resolution slots is greater than the number of sets within each of said congruence classes.

3. The cache memory according to claim 1, wherein bits within said set prediction slots are assigned according to the most-recently used set of a previous cycle.

4. The cache memory according to claim 1, wherein each of said plurality of set prediction resolution slots includes a six-transistor storage cell.

5. The cache memory according to claim 1, wherein said subset of bits from said tag field are the least significant bits from said tag field.

6. A processor having a cache memory that can be accessed by utilizing an effective address, wherein said effective address includes a byte field, a line field, and an effective page number field, said processor comprising:

a plurality of execution units; and a cache memory coupled to said plurality of execution units, wherein said cache memory includes a directory;

a memory array associated with said directory, wherein said memory array includes a plurality of congruence classes and each of said congruence classes includes a plurality of sets, wherein said memory array includes a set prediction array integrated within said memory array via an association of a line entry within said set prediction array to a congruence class within said memory array such that said line entry within said set prediction array and said congruence class are accessed in a same cycle, wherein said line entry within said set prediction array includes a plurality of set prediction resolution slots, the number of said plurality of set prediction resolution slots does not correspond to the number of sets within each of said congruence classes, and one of said plurality of prediction resolution slots is selected during said cache access by a subset of bits from said tag field; and a translation lookaside buffer for determining whether or not said cache memory stores data associated with an effective address, in response to said cache access by said effective address.

7. The processor according to claim 6, wherein the number of said prediction resolution slots is greater than the number of sets within each of said congruence classes.

8. The processor according to claim 6, wherein bits within said set prediction slots are assigned according to the most-recently used set of a previous cycle.

9. The processor according to claim 6, wherein each of said set prediction resolution slots includes a six-transistor storage cell.

10. The processor according to claim 6, wherein said subset of bits from said tag field are the least significant bits from said tag field.

* * * * *